US006188075B1

(12) United States Patent
Takayama et al.

(10) Patent No.: US 6,188,075 B1
(45) Date of Patent: Feb. 13, 2001

(54) ELECTRON BEAM IRRADIATING METHOD AND OBJECT TO BE IRRADIATED WITH ELECTRON BEAM

(75) Inventors: Michio Takayama; Masami Kuwahara; Takeshi Hirose; Toru Kurihashi; Masayoshi Matsumoto, all of Tokyo (JP)

(73) Assignee: Toyo Ink Manufacturing Co., Ltd., Tokyo (JP)

( * ) Notice: Under 35 U.S.C. 154(b), the term of this patent shall be extended for 0 days.

(21) Appl. No.: 09/065,052

(22) PCT Filed: Sep. 4, 1997

(86) PCT No.: PCT/JP97/03106

§ 371 Date: Apr. 27, 1998

§ 102(e) Date: Apr. 27, 1998

(87) PCT Pub. No.: WO98/10430

PCT Pub. Date: Mar. 12, 1998

(30) Foreign Application Priority Data

| | | |
|---|---|---|
| Sep. 4, 1996 | (JP) | 8-234327 |
| Sep. 20, 1996 | (JP) | 8-250262 |
| Oct. 17, 1996 | (JP) | 8-294616 |
| Dec. 3, 1996 | (JP) | 8-336295 |
| Dec. 27, 1996 | (JP) | 8-356770 |

(51) Int. Cl.[7] ................................ G21K 5/04; C08J 7/18; B29C 35/08

(52) U.S. Cl. ........................................ 250/492.3; 427/495

(58) Field of Search .......................... 250/492.3; 427/495

(56) References Cited

U.S. PATENT DOCUMENTS

| | | | |
|---|---|---|---|
| 3,798,053 * | 3/1974 | Huemmer | 250/492.3 |
| 4,590,020 | 5/1986 | Itaba et al. | 264/22 |
| 5,414,267 | 5/1995 | Wakalopulos | 250/492.3 |

FOREIGN PATENT DOCUMENTS

| | | |
|---|---|---|
| 0 120 672 | 10/1984 | (EP) . |
| 2-18217 | 4/1990 | (JP) . |
| 2-208325 | 8/1990 | (JP) . |
| 2-47334 | 10/1990 | (JP) . |
| 6-47883 | 2/1994 | (JP) . |
| 8-141955 | 6/1996 | (JP) . |

* cited by examiner

*Primary Examiner*—Jack Berman
(74) *Attorney, Agent, or Firm*—Frishauf, Holtz, Goodman, Langer & Chick, P.C.

(57) ABSTRACT

A process of accelerating electrons with a voltage applied thereto in a vacuum, guiding the accelerated electrons into a normal-pressure atmosphere, and irradiating the electron beam (EB) onto an object. The electron beam irradiation process uses a vacuum tube-type electron beam irradiation apparatus, and with the acceleration voltage for generating an electron beam set at a value smaller than 100 kV, the electron beam is irradiated onto the object.

3 Claims, 7 Drawing Sheets

ELECTRON BEAM IRRADIATING METHOD AND OBJECT TO BE IRRADIATED WITH ELECTRON BEAM

TECHNICAL FIELD

The present invention relates to an electron beam irradiation process for irradiating an object with an electron beam (EB) which is obtained by accelerating electrons with a voltage applied thereto in a vacuum and guiding the accelerated electrons into a normal-pressure atmosphere, and to an object irradiated with such an electron beam.

BACKGROUND ART

There has been proposed a process utilizing electron beam irradiation to crosslink, cure or modify a coating material applied to a substrate or base, such as paint, printing ink, adhesive, pressure sensitive, etc., or other resin products, and extensive studies have been made up to the present. In this process, electrons are accelerated with a voltage applied thereto in a vacuum and the accelerated electrons are guided into a normal-pressure atmosphere, such as in the air, so that an object may be irradiated with an electron beam (EB).

Crosslinking, curing or modification by means of electron beam irradiation have the following advantages:

(1) Organic solvent need not be contained as a diluent, and thus the adverse effect on the environment is small.

(2) The rate of crosslinking, curing or modification is high (productivity is high).

(3) The area required for crosslinking, curing or modification is small, compared with heat drying treatment.

(4) The substrate or base is not applied with heat (electron beam irradiation is applicable to those materials which are easily affected by heat).

(5) Post-treatment can be immediately carried out (cooling, aging, etc. are unnecessary).

(6) It is necessary that the conditions for electrical operation be controlled, but the required control is easier than the temperature control for heat drying treatment.

(7) Neither initiator nor sensitizing agent is required, and thus the final product contains less impurities (quality is improved).

According to conventional electron beam irradiation techniques, however, a high-energy electron beam is used to crosslink, cure or modify objects at a high rate, and no consideration is given to energy efficiency.

Conventional techniques are also associated with problems such as the problem that much initial investment is required because of large-sized apparatus, the problem that inerting by means of an inert gas such as nitrogen, which is high in running cost, is needed in order to eliminate inhibition to the reaction at surface caused due to generation of oxygen radical, and the problem that shielding from secondary X-ray is required.

Specifically, conventional electron beam curing or crosslinking uses an acceleration voltage which is usually as high as 200 kV to 1 MV and thus x-rays are generated, making it necessary to provide a large-scale shield for the apparatus. Also, where such a high-energy electron beam is used, care must be given to possible adverse influence on the working environment due to generation of ozone. Since the reaction at the surface of an object is inhibited due to generation of oxygen radical, moreover, inerting by means of an inert gas such as nitrogen is required.

Further, an electron beam generated with a high acceleration voltage applied thereto penetrates to a great depth and thus can sometimes deteriorate the substrate or base such as a resin film or paper. In the case of paper, for example, disintegration of cellulose due to the breakage of glycoside bond takes place at a relatively small dose, and it is known that deterioration in the folding strength is noticeable even at an irradiation dose of 1 Mrad or less. Especially in the case where the substrate or base has a coating material (printing ink, paint, adhesive, etc.) of 0.01 to 30 $\mu$m thick printed thereon or applied thereto, the thickness of the coating material is small and the substrate or base may have an exposed surface having no coating material thereon, often giving rise to a problem that the substrate or base is deteriorated.

Accordingly, there is a demand for low-energy electron beam irradiation apparatus and process which use low acceleration voltage and which permit reduction in size of the apparatus.

To meet the demand, various apparatus and process using low acceleration voltage for electron beam irradiation have been proposed, and Japanese Patent Disclosure (KOKAI) No.5-77862, for example, discloses a process for 30-Mrad irradiation at 200 kV, as an example of electron beam irradiation at a low acceleration voltage. However, even with this process, the acceleration voltage is not low enough to prevent deterioration of the substrate or base and also inerting is required.

Japanese Patent Disclosure No. 6-317700 discloses an apparatus and process for irradiating an electron beam with the acceleration voltage adjusted to 90 to 150 kV. According to this technique, a titanium or aluminum foil of 10 to 30 $\mu$m in thickness is used as a window material which intervenes between an electron beam generating section of the electron beam irradiation apparatus, in which electrons released from the cathode are guided and accelerated to obtain an electron beam, and an irradiation room in which an object is irradiated with the electron beam.

However, even with this technique, when the acceleration voltage is set to 100 kV or less in actuality, the penetrating power of the electron beam is very low, and since most of the electron beam is absorbed by the window material, the electron beam cannot be efficiently guided into the irradiation room. Also, the temperature of the window material may possibly rise up to its heat resistance temperature or higher. Consequently, the apparatus is in practice used with the acceleration voltage set at a level higher than 100 kV, and even with such acceleration voltage, deterioration of the substrate or base can be caused.

Thus, the electron beam curing technique has been attracting attention as a process which serves to save energy, does not require the use of solvent and is less harmful to the environment, but it cannot be said that the technique has been put to fully practical use because of the aforementioned problems.

DISCLOSURE OF THE INVENTION

The present invention was created in view of the above circumstances, and an object thereof is to provide an electron beam irradiation process capable of irradiating an electron beam with high energy efficiency and an object irradiated with such an electron beam, without entailing problems with apparatus etc.

According to a first aspect of the present invention, there is provided an electron beam irradiation process for performing electron beam irradiation by using a vacuum tube-type electron beam irradiation apparatus, wherein an object is irradiated with an electron beam with an acceleration voltage for generating the electron beam set at a value smaller than 100 kV. Also, according to this aspect of the invention, an electron beam irradiation process is provided wherein the acceleration voltage is 10 to 60 kV and the object comprises a coating of 0.01 to 30 μm thick formed on a substrate or base.

According to a second aspect of the present invention, an electron beam irradiation process for irradiating an object with an electron beam is provided, wherein an electron beam is irradiated in such a manner that a rate of absorption y (%) of the irradiated electron beam by an object, which rate of absorption is expressed as "absorbed dose for a certain depth/all absorbed dose", fulfills a relationship indicated by expression (1) below, where x is a product of penetration depth (μm) and specific gravity of the object. Also provided according to this aspect of the invention is an electron beam irradiation process wherein an acceleration voltage for generating the electron beam is 100 kV or less and the object has a thickness of 50 μm or less. Further, an electron beam irradiation process is provided wherein irradiation of the electron beam is performed using a vacuum tube-type electron beam irradiation apparatus.

$$y \geqq -0.01x^2+2x\quad(0<x\geqq 100) \tag{1}$$

The penetration depth indicates a distance in the thickness direction of the object for which the irradiated electron beam penetrates.

According to a third aspect of the present invention, there is provided an electron beam irradiation process for irradiating an object with an electron beam, wherein when an acceleration voltage of an electron beam to be irradiated is lower than or equal to 40 kV, the electron beam is irradiated in such a manner that an oxygen concentration of a region irradiated with the electron beam is substantially equal to or lower than air, and when the acceleration voltage of an electron beam to be irradiated is higher than 40 kV, the electron beam is irradiated in such a manner that the oxygen concentration of the region irradiated with the electron beam fulfills a relationship indicated by expression (a)

$$Y \leqq 1.19\times10^{2}\times\exp(-4.45\times10^{-2}\times X) \tag{a}$$

where X is the acceleration voltage (kV) and Y is the oxygen concentration (%) of the region irradiated with the electron beam.

Preferably, in this case, when an acceleration voltage of an electron beam to be irradiated is lower than or equal to 40 kV, the electron beam is irradiated in such a manner that an oxygen concentration of a region irradiated with the electron beam is substantially equal to or lower than air, and when the acceleration voltage of an electron beam to be irradiated is higher than 40 kV, the electron beam is irradiated in such a manner that the oxygen concentration of the region irradiated with the electron beam fulfills a relationship indicated by expression (b)

$$1.19\times10^{2}\times\exp(-4.45\times10^{-2}\times X) \geqq Y \geqq 0.05 \tag{b}$$

where X is the acceleration voltage (kV) and Y is the oxygen concentration (%) of the region irradiated with the electron beam.

According to a fourth aspect of the present invention, there is provided an electron beam irradiation process, wherein an object having a curved or uneven surface is irradiated with an electron beam while an electron beam generating section of an electron beam irradiation apparatus is moved for scanning. Also, according to this aspect of the invention, an electron beam irradiation process is provided wherein the electron beam generating section is moved for scanning while a distance between the electron beam generating section and the object is kept at a constant value by means of a sensor.

According to a fifth aspect of the present invention, there is provided an electron beam irradiation process, wherein a distribution of degree of crosslinking, curing or modification is created in a thickness direction of an object by irradiating the object with an electron beam.

BEST MODE OF CARRYING OUT THE INVENTION

Embodiments according to the present invention will be hereinafter described in detail.

Figure 1:
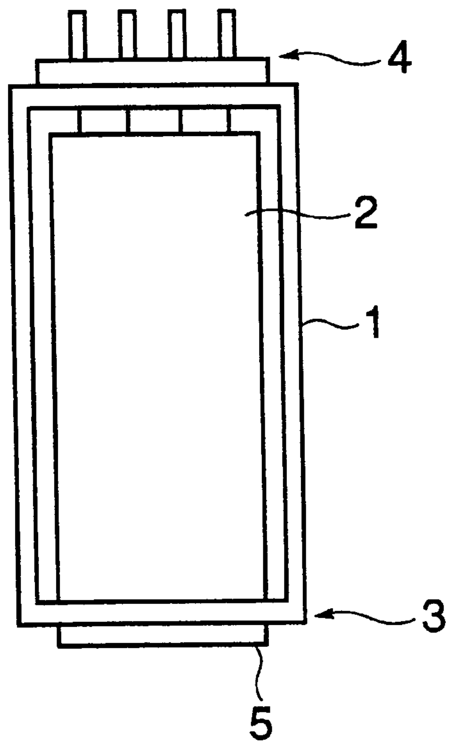
FIG. 1 is a schematic view of an electron beam irradiation apparatus for carrying out the present invention.
Figure 2:
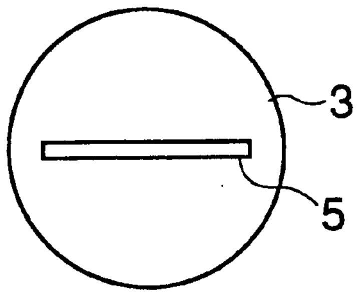
FIG. 2 is a view showing an electron beam emitting section of the apparatus in FIG. 1.

FIG. 1 is a schematic view of an irradiation tube which is used as an electron beam generating section in an electron beam irradiation apparatus for carrying out the present invention. The apparatus includes a cylindrical vacuum container 1 made of glass or ceramic, an electron beam generating section 2 arranged within the container 1 for guiding and accelerating electrons released from a cathode to obtain an electron beam, an electron beam emitting section 3 arranged at one end of the vacuum container 1 for emitting the electron beam, and a pin section 4 for feeding power to the apparatus from a power supply, not shown. The electron beam emitting section 3 is provided with a thin-film irradiation window 5. The irradiation window 5 of the electron beam emitting section 3 has a function of transmitting electron beam, and not gas, therethrough and is flat in shape, as shown in FIG. 2. An object placed in an irradiation room is irradiated with the electron beam emitted through the irradiation window 5.

Namely, this apparatus is a vacuum tube-type electron beam irradiation apparatus, which differs basically from a conventional drum-type electron beam irradiation apparatus. In the conventional drum-type electron beam irradiation apparatus, electron beam is radiated while a vacuum is drawn all the time within the drum.

An apparatus provided with an irradiation tube having such configuration is disclosed in U.S. Pat. No. 5,414,267 and has been proposed by American International Technologies (AIT) INC. as Min-EB apparatus. With this apparatus, reduction in the penetrating power of electron beam is small even at a low acceleration voltage of as small as 100 kV or less, and an electron beam can be obtained effectively. It is therefore possible to allow an electron beam to act upon a coating material on a substrate or base for a small depth, and also to decrease damage on the substrate or base as well as the quantity of secondary X-rays generated, making it almost unnecessary to provide a large-scale shield.

Further, since the energy of electron beam is low, inhibition to the reaction at the surface of the coating material due to oxygen radical can be decreased, thus diminishing the need for inerting.

The inventors hereof diligently investigated the acceleration voltage to be applied to an electron beam and the allowable oxygen concentration in a low acceleration voltage region. As a result of investigation, they found that, where the acceleration voltage applied to the electron beam was higher than 40 kV, predetermined crosslinking, curing or modifying power could be achieved by irradiating an object with the electron beam in such a manner that the oxygen concentration of a region irradiated with the electron beam fulfilled the relationship indicated by expression (a) below, without entailing inhibition to the reaction at the surface of the coating material etc. due to oxygen radical.

$$Y \leqq 1.19\times10^{2}\times\exp(-4.45\times10^{-2}\times X) \quad (a)$$

where X is the acceleration voltage (kV) and Y is the oxygen concentration (%) of the region irradiated with the electron beam.

It was also found that, for irradiation at 40 kV or lower, electron beam irradiation could be satisfactorily performed at an oxygen concentration of 20% or thereabouts, that is, almost without the need for inerting.

According to the present invention, therefore, where the acceleration voltage applied to the electron beam is 40 kV or lower, electron beam irradiation is performed at an oxygen concentration lower than or substantially equal to that of the air, and where the acceleration voltage is higher than 40 kV, the electron beam is irradiated onto an object with the oxygen concentration controlled so as to fulfill the relationship indicated by the above equation (a), wherein X represents the acceleration voltage (kV) and Y represents the oxygen concentration (%) of the region irradiated with the electron beam.

Taking account of the oxygen radical-induced inhibition to the reaction at the surface of the object such as the coating material etc., the oxygen concentration should preferably fall within the range indicated by expression (b) below, though there is no lower limit on the oxygen concentration, from the point of view of the running cost incurred by the replacement with nitrogen.

$$1.19\times10^{2}\times\exp(-4.45\times10^{-2}\times X) \geqq Y \geqq 0.05 \quad (b)$$

It is also known that, with such a low acceleration voltage, the quantity of ozone produced could be greatly cut down at the same time.

Irradiating an electron beam in the air without the need for inerting provides various advantages including reduction of the running cost. In view of this, according to the present invention, in order to eliminate inhibition to polymerization due to oxygen radical, which is a problem associated with electron beam irradiation in the air, an object is first irradiated with ultraviolet rays to such an extent that only a surface region thereof is crosslinked, cured or modified, and then is irradiated with the electron beam. This permits the object to be more satisfactorily crosslinked, cured or modified without the oxygen inhibition to polymerization.

Also, by first irradiating an object in the air with an electron beam at an acceleration voltage of 40 kV or lower and then with ultraviolet rays, it is possible to obtain an equally satisfactorily cured object without the oxygen inhibition to polymerization.

A similar effect can be achieved by first irradiating an object in the air with an electron beam at an acceleration voltage of 40 kV or lower and then with an electron beam at a higher acceleration voltage. Preferably, in this case, the electron beam is irradiated first at an acceleration voltage of 30 kV or lower and then at a higher acceleration voltage.

Figure 3:
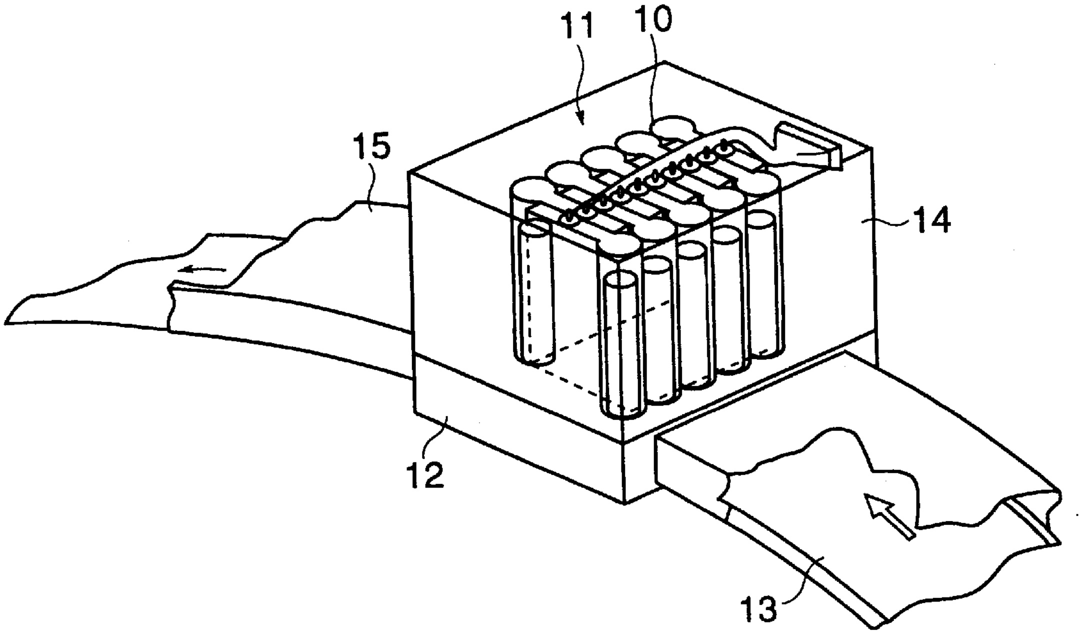
FIG. 3 is a view illustrating how the present invention is carried out according to one embodiment.

According to a typical process embodying the present invention, an array 11 is constituted by combining a plurality of electron beam irradiation apparatus 10 having the configuration described above, as shown in FIG. 3, and electron beams are irradiated from the individual electron beam irradiation apparatus 10 constituting the array 11 onto an object 13 transported at a predetermined speed in an irradiation room 12 which is located beneath the array 11. In the figure, reference numeral 14 denotes an X-ray shield and 15 denotes a conveyor shield.

Thus, the shields can be reduced in size, the degree of inerting can be lowered, and also the electron beam generating section can be reduced in size because the acceleration voltage is low; therefore, the electron beam irradiation apparatus can be drastically reduced in size and its application to a variety of fields is expected.

Figure 4:
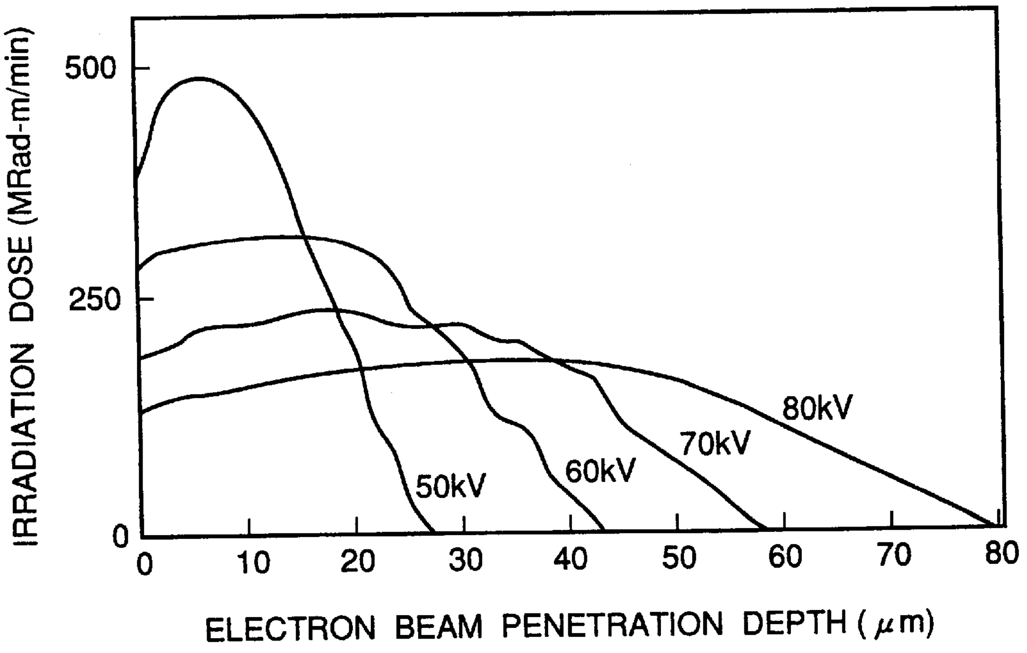
FIG. 4 is a graph showing the relationship between electron beam penetration depth and irradiation dose observed when electron beam is irradiated at different acceleration voltages by using a vacuum tube-type electron beam irradiation apparatus.

The apparatus uses a low acceleration voltage, thus providing a small depth of penetration of the electron beam, and since the acceleration voltage can be controlled with ease, it is possible to control the electron beam penetration depth. This will be explained with reference to FIG. 4. FIG. 4 shows the relationship between electron beam penetration depth and irradiation dose observed when electron beam is irradiated at different acceleration voltages with the use of the aforementioned apparatus. The figure reveals that, where the acceleration voltage is low, the electron beam can exert a marked effect within a certain range of thickness, and where the acceleration voltage is high, the electron beam penetrates through the coating to the substrate or base.

This implies that, in the case of electron beam irradiation at low acceleration voltage, low energy generation suffices to obtain an irradiation dose required to crosslink, cure or modify the coating with the electron beam.

With conventional electron beam irradiation apparatus, an electron beam cannot be obtained but at high acceleration voltage, and therefore, an electron beam of excessively high energy must be irradiated onto ink, paint, adhesive or the like to crosslink, cure or modify the same, thus leaving no room for consideration of the rate of absorption of the electron beam.

By contrast, according to the present invention which is based on the assumption that the aforementioned vacuum tube-type electron beam irradiation apparatus excellent in controllability is used, the electron beam is irradiated in such a manner that a rate of absorption y (%) of the irradiated electron beam by an object, which rate of absorption is expressed as "absorbed dose for a certain depth/all absorbed dose", fulfills the relationship indicated by expression (1) below.

$$y \geqq -0.01x^{2}+2x \quad (0<x\leqq100) \quad (1)$$

where x is the product of the depth of penetration ($\mu$m) and the specific gravity of the object.

Figure 5:
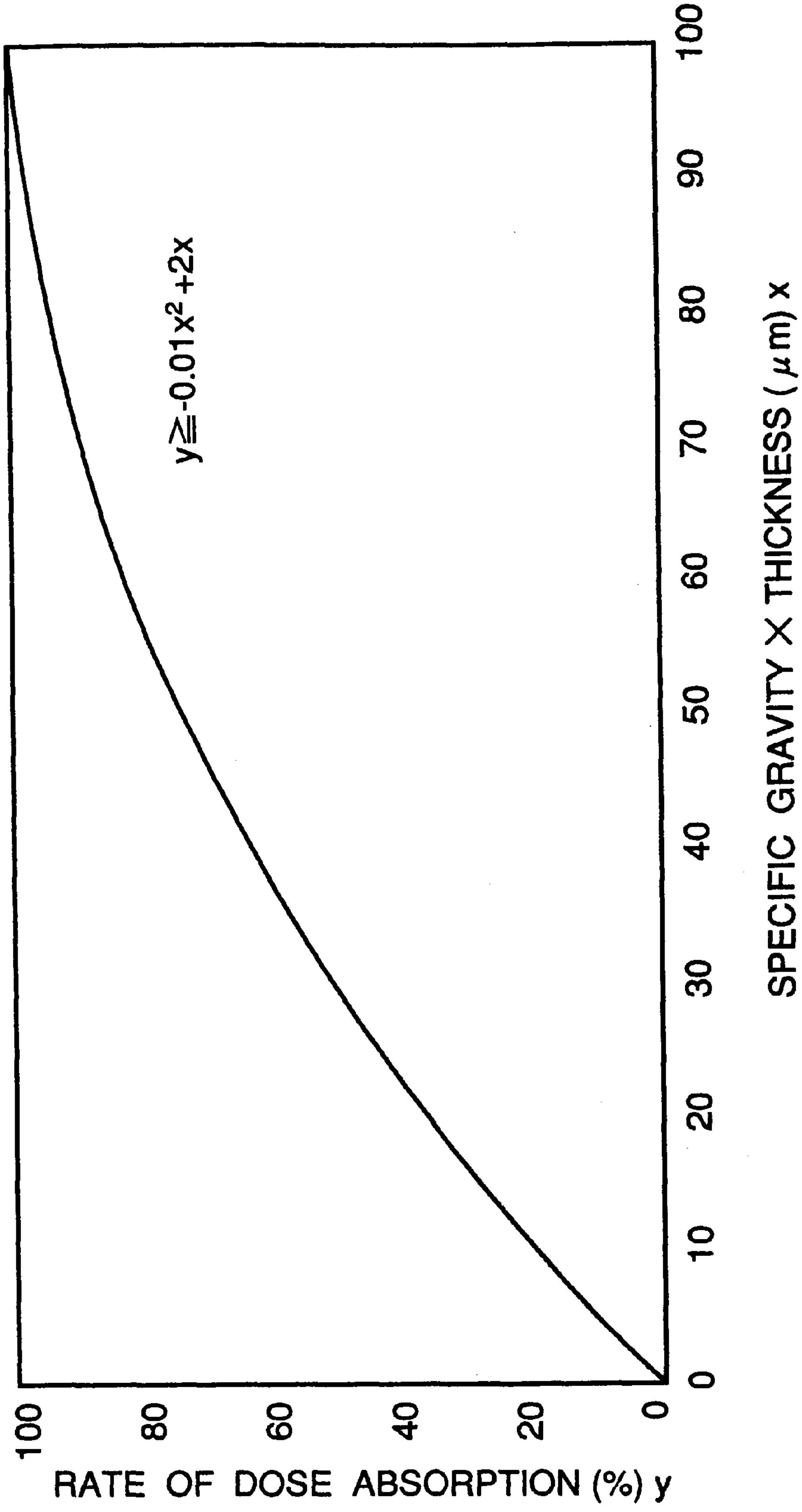
FIG. 5 is a graph illustrating a range according to the present invention.

Namely, the electron beam is irradiated in an upper region in FIG. 5 defined by the curve.

The rate of the electron beam absorption as defined above increases with reduction in the acceleration voltage applied to the electron beam, and therefore, in the case where an electron beam is irradiated using the vacuum tube-type electron beam irradiation apparatus capable of effectively emitting an electron beam even at a low acceleration voltage, high rate of absorption can be achieved. The curve in FIG. 5 illustrates the case where the acceleration voltage is 100 kV, and the present invention is intended to irradiate an electron beam with a rate of absorption higher than or equal to that on the curve, that is, at an acceleration voltage lower than or equal to 100 kV. For an identical acceleration voltage, the rate of absorption increases with increase in the product of the penetration depth and the specific gravity of an object, and shows a maximum value when the product takes a certain value.

In this case, the object to be irradiated with the electron beam preferably has a thickness of approximately 100 $\mu$m or less.

To measure the irradiation dose of an electron beam, a method using a film dosimeter is very often employed. The film dosimeter uses a dose measurement film whose spectral properties change on absorbing energy when irradiated with an electron beam and utilizes the fact that there is a correlation between the amount of such change in the spectral properties and the absorbed dose.

Since high rate of absorption can be achieved as described above, it is possible to irradiate an electron beam with high energy efficiency that is not achievable with conventional apparatus. Consequently, where an object is irradiated with an electron beam for the purpose of crosslinking, curing or modification, for example, the purpose is fulfilled with the use of low energy which is about ¼ to ½ of that needed in conventional apparatus.

The present invention uses an electron beam irradiation apparatus provided with the aforementioned irradiation tube as the electron beam generating section, and when an object having a curved or uneven surface is to be irradiated with an electron beam, the irradiation tube itself is moved for scanning. Specifically, a sensor is mounted to the irradiation tube so that the distance to the surface of the coating material etc. on the substrate or base may be controlled to a constant value, and the irradiation tube is moved for scanning by a three-dimensional robot etc. having an articulated arm. This prevents uneven curing and permits the electron beam to be irradiated more efficiently. In this case, the width of irradiation may be suitably selected in accordance with the size or the shape of the surface, curved or irregular, of an object to be irradiated or of the substrate or base having a coating material thereon. The electron beam emitted through the window of the irradiation tube reaches the coating material and cures, crosslinks or modifies the coating material.

Since, in this case, the electron beam is irradiated to the entire surface, time is required for the scanning with the use of the irradiation tube, but no problem arises because the rate of reaction by means of electron beam is by far higher than that of thermal curing or UV curing, as is already known in the art.

Figure 6:
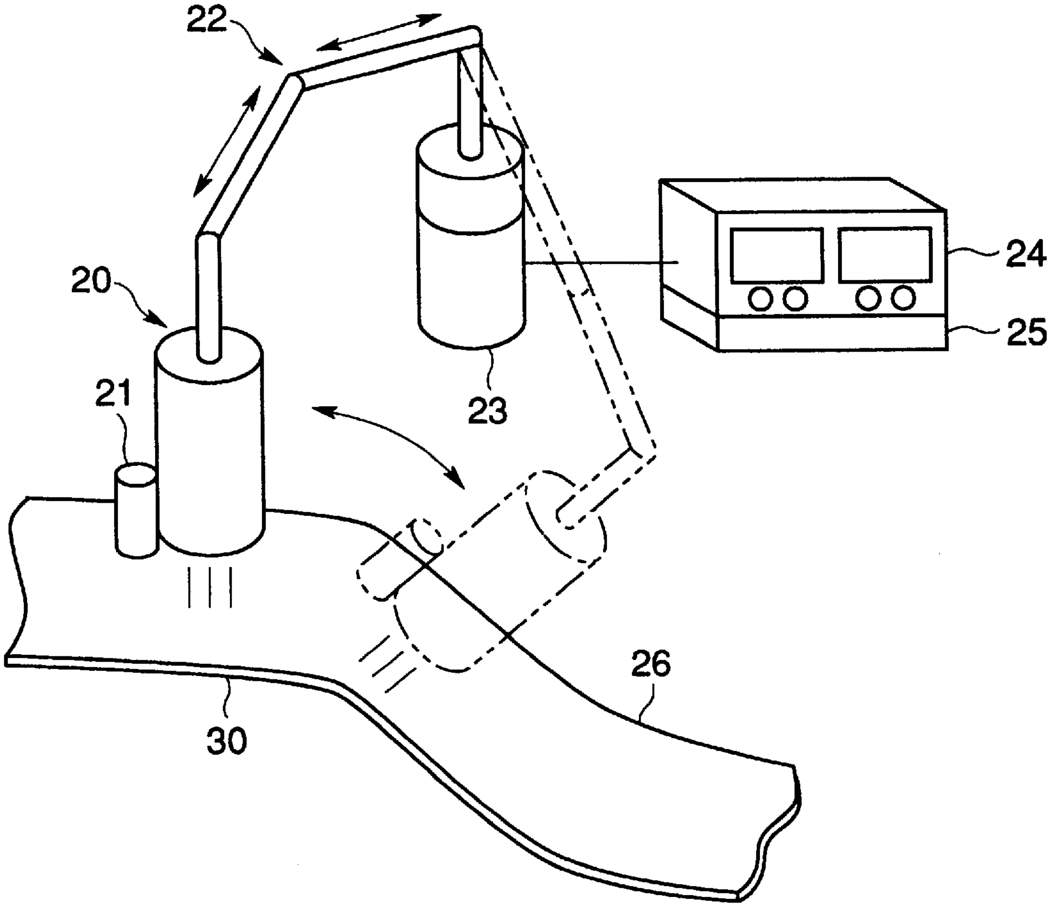
FIG. 6 is a schematic view showing a specific arrangement of an electron beam irradiation apparatus used for carrying out the present invention.
Figure 7:
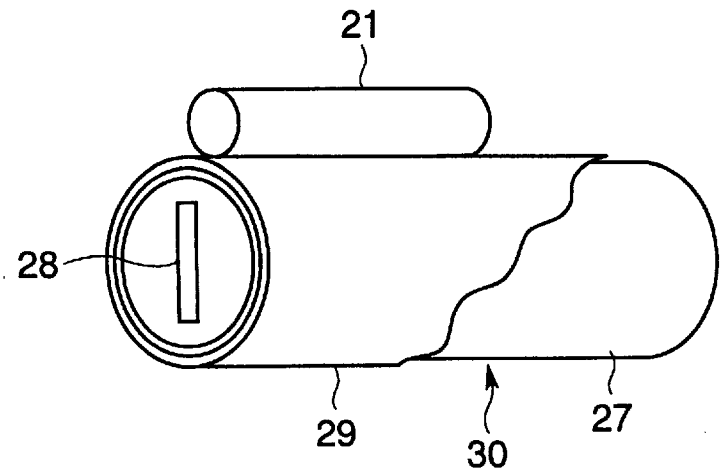
FIG. 7 is a partially cutaway perspective view showing a main body of the apparatus in FIG. 6 including an irradiation tube.

FIG. 6 shows a specific arrangement of an electron beam irradiation apparatus for carrying out the present invention. In the figure, reference numeral 20 denotes a main body including an electron beam irradiation tube, and an optical sensor 21 is mounted to the main body 20. As shown in FIG. 7, the main body 20 comprises an irradiation tube 27 having an irradiation window 28, and a shielding member 29 surrounding the irradiation tube.

The optical sensor 21 is attached to the shielding member 29 and emits light from a distal end thereof to detect the distance between the surface of a coating material 26 on a curved substrate or base 30 and the irradiation window 28.

The main body 20 is mounted to a distal end of an articulated expansion arm 22, which is actuated by an arm driving robot 23. The arm robot 23 is controlled by a control unit 24. Reference numeral 25 denotes a power supply unit.

In the apparatus having such arrangement, the control unit 24 supplies a command to the arm robot 23 in accordance with information from the optical sensor 21 and set information, to move the main body 20 including the irradiation tube for scanning via the articulated arm 22 in such a manner that the distance between the irradiation window 28 and the coating material 26 is kept constant.

The apparatus uses the articulated expansion arm 22 and thus can freely follow up the object or the substrate or base even if it has a curved surface. Also, the use of the optical sensor 21 permits the distance between the irradiation window 28 and the coating material 26 to be kept constant. Consequently, uneven curing is prevented and the electron beam can be irradiated with higher efficiency.

Taking advantage of the fact that the electron beam penetration depth is controllable, the present invention creates a distribution of the degree of crosslinking, curing or modification in the thickness direction of an object by irradiating the object with an electron beam.

Specifically, an object is irradiated with an electron beam at an acceleration voltage having a predetermined intermediate penetration depth along the thickness of the object, so that while the surface region of the object up to the penetration depth is crosslinked, cured or modified, the deeper region than the penetration depth is lower in the degree of crosslinking, curing or modification than the surface region or is not crosslinked, cured or modified at all. As a result, a distribution of the degree of crosslinking, curing or modification in the thickness direction is produced. To put it in another way, the object can be partially crosslinked, cured or modified with respect to the thickness direction thereof. As a typical example, only the surface region of the object may be crosslinked, cured or modified.

Thus, the degree of crosslinking, curing or modification can be distributed, so that the present invention has a wide variety of applications.

Specifically, the present invention can provide a structure of which the surface alone has high hardness while the interior of which is soft, a structure of which the surface alone has low hardness, a gradation structure or layered structure of which the degree of crosslinking, hardness or modification varies gradually.

Crosslinking and curing achieved by the present invention also include graft polymerization, and modification signifies breakage of chemical bond, orientation, etc., exclusive of crosslinking and polymerization.

To form a gradation structure or layered structure without fail, preferably the object is first crosslinked, cured or modified partially with respect to the thickness direction and then heat-treated to crosslink, cure or modify the non-crosslinked, non-cured or non-modified portion to a certain extent, thereby creating a distribution of the degree of crosslinking, curing or modification.

The apparatus to which the electron beam irradiation process according to the present invention is applied is not particularly limited, but the aforementioned vacuum tube type is preferred in view of controllability. Namely, a vacuum tube-type electron beam irradiation apparatus, a typical example of which is Min-EB, can effectively radiate an electron beam even at low acceleration voltage as described above; therefore, the electron beam can be made to act upon a small depth with good controllability and also controllability of the penetration depth is high.

From the point of view of controllability of the penetration depth, the acceleration voltage applied to the electron beam is preferably 150 kV or less, more preferably 100 kV or less. The still more preferred range of the acceleration voltage is from 10 to 70 kV. To carry out the electron beam irradiation process of the present invention at such a low acceleration voltage, an object to be irradiated with the electron beam preferably has a thickness of 10 $\mu$m or more, more preferably 10 to 300 $\mu$m. The still more preferred range of thickness is approximately 10 to 100 $\mu$m. The thickness of the object may of course be less than 10 $\mu$m, that is, in the range of 1 to 9 $\mu$m, or may be greater than 300 $\mu$m.

Objects to which the present invention is applicable include not only a relatively thin material formed on a substrate or base, such as printing ink, paint, adhesive, pressure sensitive, etc., but a plastic film, a plastic sheet, a printing plate, a semiconductor material, a controlled release material of which the active ingredient is gradually released, such as a poultice, and a golf ball.

Among these, for printing ink and paint formed on a substrate or base, only the surface region is crosslinked or cured, whereby shrinkage of the portion adjoining the substrate or base is suppressed and thus the adherence to the substrate or base can be enhanced. For adhesive or pressure sensitive,only the surface region is crosslinked or cured while the soft, adhesive interior is left as it is, whereby such adhesives can be applied to a variety of fields.

Objects to be irradiated with electron beam, to which the present invention can be applied, also include, for example, a coating material applied to a substrate or base, such as printing ink, paint, adhesive, etc.

Among these, printing ink maybe ink which crosslinks or cures when exposed to activation energy such as ultraviolet rays, electron beam or the like, for example, letterpress printing ink, offset printing ink, gravure printing ink, flexographic ink, screen printing ink, etc.

Examples of paint include resins such as acrylic resin, epoxy resin, urethane resin, polyester resin, etc., various photosensitive monomers, and paints which use oligomers and/or prepolymers and which crosslink or cure upon exposure to activation energy such as ultraviolet rays, electron beam or the like.

For adhesive, adhesives of reactive curing type (monomer type, oligomer type, prepolymer type) such as vinyl polymer type (cyanoacrylate, diacrylate, unsaturated polyester resin), condensation type (phenolic resin, urea resin, melamine resin), and polyaddition type (epoxy resin, urethane resin) may be used. Such adhesive may be used to bond those, materials which are easily affected by heat, such as lens, glass sheet, etc., besides conventional applications.

Substrates or bases to be coated with the coating material may be metals such as treated or untreated stainless steel (SUS) or aluminum, plastic materials such as polyethylene, polypropylene, polyethylene terephthalate or polyethylene naphthalate, paper, fibers, etc.

The coating materials mentioned above may contain various additives conventionally used. Such additives include, for example, pigment, dye, stabilizer, solvent, antiseptic, anti-fungus agent, lubricant, activator, etc.

EXAMPLES

Examples according to the present invention will be now described. In the following description, the terms "parts" and "%" represent "parts by weight" and "% by weight", respectively.

(Example 1)

As an example of curable coating composition, offset printing ink was used. The offset printing ink was prepared following the procedure described below.

[Preparation of Varnish]

A vessel was charged with 69.9% dipentaerythritol hexaacrylate and 0.1% hydroquinone, and after the mixture was heated to 100° C., 30 parts of DT (diallyl phthalate resin from Tohto Kasei) were charged by degrees. After the constituents were dissolved, the mixture was bailed out. The mixture at this time had a viscosity of 2100 poises (25° C.).

[Preparation of Printing Ink]

A mixture specified below was dispersed using a three-roll mill, thereby obtaining offset printing ink.

| | |
|---|---|
| Blue pigment (LIONOL BLUE FG7330) | 15 parts |
| Varnish prepared as stated above | 50 parts |
| Dipentaerythritol hexaacrylate | 25 parts |
| Pentaerythritol tetraacrylate | 10 parts |

Using an RI tester (handy printing machine generally used in the printing ink industry), the ink prepared as stated above was used to obtain a print on which about 2-$\mu$m thick ink was printed.

After the printing, EB irradiation was performed using a Min-EB apparatus from AIT Corporation. The conditions for irradiation were as follows: acceleration voltage: 40 kV; electric power used: 50 W; and conveyor speed: 20 m/min. For the inerting, nitrogen was used.

Following the irradiation, the drying property was evaluated by touching the surface with fingers to thereby evaluate. the degree of curing. As the criteria for evaluation, a five-grade system was employed wherein "5" indicates "completely cured" and "1" indicates "not cured."

The result obtained is shown in Table 1.

(Example 2)

Except that the formulation of Example 1 was changed as stated below, printing was performed in the same manner, EB irradiation was performed under the same conditions, and the degree of curing was evaluated based on the aforementioned criteria. The evaluation result is also shown in Table 1.

| | |
|---|---|
| Blue pigment (LIONOL BLUE FG7330) | 12 parts |
| Varnish prepared as stated above | 50 parts |
| Dipentaerythritol hexaacrylate | 28 parts |
| Pentaerythritol tetraacrylate | 10 parts |

(Example 3)

After printing was performed in the same manner as in Example 1 by using ink identical with that used in Example 1, EB irradiation was performed under the same conditions as in Example 1 except that the acceleration voltage was changed to 60 kV, followed by evaluation of the degree of curing based on the aforementioned criteria. The result of evaluation is shown in Table 1.

(Example 4)

After printing was carried out in the same manner as in Example 1 by using ink identical with that used in Example 1, EB irradiation was performed under the same conditions as in Example 1 except that the acceleration voltage was raised to 90 kV, and the degree of curing was evaluated based on the aforementioned criteria. The evaluation result is shown in Table 1.

(Example 5)

In this example, paint for can coating was used as the curable coating composition. The paint was prepared according to the following formulation:

| | |
|---|---|
| Bisphenol A epoxy acrylate (EBECRYL EB600 from Daicel UCP Corp.) | 55 parts |
| Triethylene glycol diacrylate | 35 parts |
| Ketone formaldehyde resin (Tg: 83° C.; Mn: 800; synthetic resin SK from Hules Corp.) | 20 parts |
| Titanium oxide (rutile type) (TIPAQUE CR-58 from Ishihara Sangyo Kaisha, Ltd.) | 100 parts |

These were mixed and then dispersed for one hour in a sand mill to obtain the paint.

The paint was applied to a PET film which had a tin-free steel plate of 300 μm thick laminated with a PET film of 100 μm, to form a 10-μm thick coating of the paint thereon, and EB irradiation was performed under the same conditions as in Example 1. To evaluate the degree of curing, the drying property was evaluated by touching the surface with fingers, as in the case of the printing ink of Example 1. Also, as the criteria for evaluation, the five-grade system was employed wherein "5" indicates "completely cured" and "1" indicates "not cured." In addition, to evaluate the hardness of the coating, pencil hardness was measured according to JIS K-5400. The obtained results are shown in Table 1.

(Example 6)

After the paint identical with that used in Example 5 was applied in the same manner as in Example 5, EB irradiation was performed under the same conditions as in Example 5 except that the acceleration voltage was changed to 60 kV, and the degree of curing was evaluated based on the aforementioned criteria. The evaluation results are shown in Table 1.

(Example 7)

After the paint identical with that used in Example 5 was applied in the same manner as in Example 5, EB irradiation was carried out under the same irradiation conditions as in Example 5 except that the acceleration voltage was raised to 90 kV, and the degree of curing was evaluated based on the aforementioned criteria. The results of evaluation are also shown in Table 1.

(Comparative Examples 1 to 4)

For Comparative Examples 1 to 3, prints and coatings were prepared under the same conditions as in Examples 1, 2 and 5, respectively, and using a CURETRON EBC-200-20-30 from Nisshin High Voltage Corporation as the EB irradiation apparatus, EB irradiation was performed under the following conditions: acceleration voltage: 100 kV; electric power used: 100 W; and conveyor speed: 20 m/min. In Comparative Example 4, the paint identical with that used in Example 5 was applied in such a manner that the coating of the paint had a thickness of 35 μm, and EB irradiation was performed in the same manner as in Example 5. These prints and coatings were then evaluated as to degree of curing based on the aforementioned criteria, and for the coatings, pencil hardness was also measured in the same manner as described above. The results are shown in Table 1.

TABLE 1

| | Acceleration voltage (kV) | Degree of curing | Coating hardness | Coating thickness (μm) |
|---|---|---|---|---|
| Example 1 | 40 | 5 | | 2 |
| Example 2 | 40 | 5 | | 2 |
| Example 3 | 60 | 5 | | 2 |
| Example 4 | 90 | 5 | | 2 |
| Example 5 | 40 | 5 | 3H | 10 |
| Example 6 | 60 | 5 | 4H | 10 |
| Example 7 | 90 | 5 | 4H | 10 |
| Comparative Example 1 | 100 | 3 | | 2 |
| Comparative Example 2 | 100 | 3 | | 2 |
| Comparative Example 3 | 100 | 3 | B | 10 |
| Comparative Example 4 | 40 | 4 | H | 35 |

As shown in Table 1, it was confirmed that sufficient degree of curing could be achieved by performing EB irradiation at low acceleration voltage with the use of the above-stated apparatus.

(Example 8)

In this example, dose rate of absorption measurement was made and an electron beam irradiation process meeting the requirements of the present invention was confirmed.

Dosemetric films (FAR WEST films) of 50 μm thick from Far West Technology Corporation, U.S.A., whose absorbance varies when irradiated with electron beam, were prepared. First, two FAR WEST films overlapped one upon the other were irradiated with an electron beam from one side, and using a spectrophotometer, it was confirmed that all radiation was absorbed by the film located on the side of the electron beam generation source while no radiation was absorbed by the other film. Subsequently, a PET film of 10 μm thick was laid over one FAR WEST film and was irradiated with an electron beam. Change in the absorbance was measured using a spectrophotometer and the absorbed dose was calculated based on the calibration curve from Far West Technology Corporation. Then, based on the absorbed doses of n films laid one upon another, the value (x) of the product of specific gravity and thickness and a rate of dose absorption (y) of coating corresponding to the value x were obtained.

In this case, y was calculated by the method indicated below.

$$y=(1-F/T)\times 100\ (\%)$$

where F is the absorbed dose of the FAR WEST film, and T is the absorbed dose of the FAR WEST film as measured in the case where no PET film is laid thereon. In the calculation, the specific gravity of the PET film was assumed to be 1.4.

Using the electron beam irradiation apparatus from AIT Corporation, U.S.A., as the irradiation apparatus, EB irradiation was performed at an acceleration voltage of 70 kV, a current value of 400 μA, and a conveyor speed of 7 m/min. The results are shown below.

| n (No. of films) | Rate of absorption y (%) |
|---|---|
| 1 | 42 |
| 2 | 72 |

-continued

| n (No. of films) | Rate of absorption y (%) |
|---|---|
| 3 | 88.3 |
| 4 | 99.2 |
| 5 | 100 |
| 6 | 100 |

Figure 8:
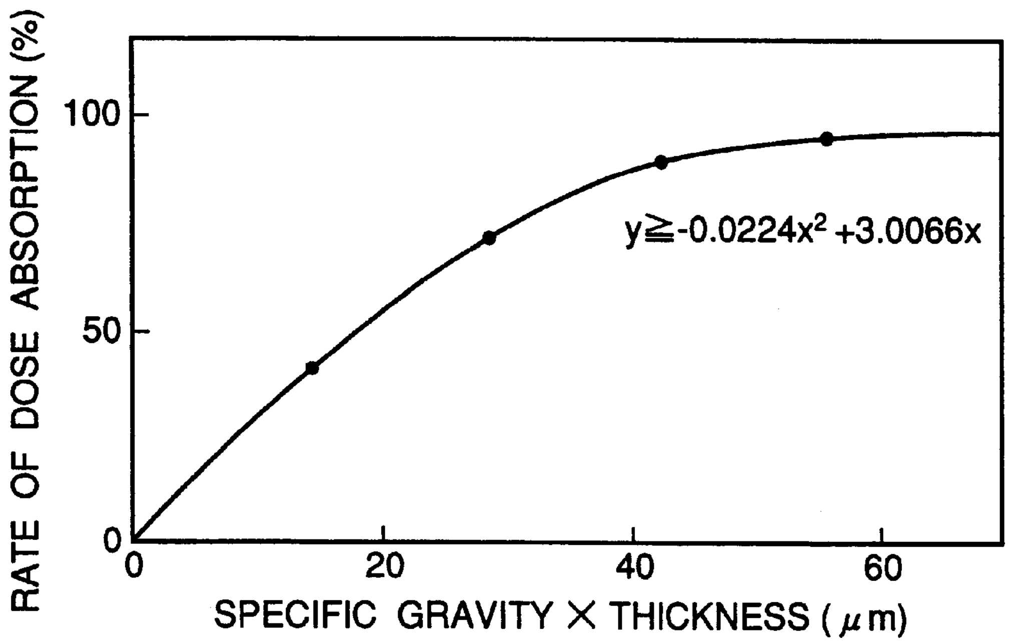
FIG. 8 is a graph showing the relationship between rate of absorption and the product of film thickness and specific gravity of an object according to one embodiment.

The relationship between the product x of specific gravity and thickness ($\mu$m) and the rate of dose absorption y (%) observed in this case is shown in FIG. 8.

As shown in the figure, the curve is given by $$y=-0.0224x^2+3.0066x(0<x\leqq 70),$$

proving that the irradiation process fulfills the range according to the present invention.

(Example 9)

In this example, paint for can coating was used as the curable coating composition. The paint was prepared as specified below.

| | |
|---|---|
| Bisphenol A epoxy acrylate (EBECRYL EB600 from Daicel UCP Corp.) | 55 parts |
| Triethylene glycol diacrylate | 35 parts |
| Ketone formaldehyde resin (Tg: 83° C.; Mn: 800; synthetic resin SK from Hules Corp.) | 20 parts |
| Titanium oxide (rutile type) (TIPAQUE CR-58 from Ishihara Sangyo Kaisha, Ltd.) | 100 parts |

These were mixed and then dispersed for one hour in a sand-mill to obtain the paint.

The paint was applied to a PET film which had a tin-free steel plate of 300 $\mu$m thick laminated with a 100-$\mu$m PET film, followed by electron beam irradiation.

The electron beam irradiation was in this case performed at acceleration voltages of 70 kV and 150 kV separately. The irradiation at 70 kV was performed using the Min-EB apparatus from IT Corporation, U.S.A., under the conditions of the current value 400 $\mu$A and the conveyor speed 7 m/min. On the other hand, the irradiation at 150 kV was carried out with the use of the electron beam irradiation apparatus CURETRON EBC200-20-30 from Nisshin High Voltage Corporation, under the conditions of the currrent value 6 mA and the conveyor speed 11 m/min. Nitrogen gas was used for the inerting.

After the paint was cured by electron beam irradiation, the hardness of the coatings was evaluated in terms of pencil hardness. Measurement of the pencil hardness was carried out according to JIS K5400, paragraph 6.14. As a result, the pencil hardness was HB in both cases. The coatings had a thickness of 6 $\mu$m and a specific gravity of 1.7.

Based on the above data, the rate of absorption of the electron beam of the paint was calculated and found to be about 28% for the paint irradiated with the electron beam at the acceleration voltage 70 kV and about 11% for the paint irradiated with the electron beam at the acceleration voltage 150 kV. From FIG. 8, where the thickness is 6 $\mu$m and the specific gravity is 1.7, x=10.2, and substituting this value in expression (1), that is, $y\geqq -0.01x^2+2x$, provides $y\geqq 19.36$ (%), revealing that the irradiation with the use of the vacuum tube-type electron beam irradiation apparatus Min-EB from AIT INC., U.S.A., fulfills the range according to the present invention and that the irradiation with the use of the electron beam irradiation apparatus CURETRON EBC200-20-30 from Nisshin High Voltage Corporation fails to fulfill the range of the present invention.

(Example 10)

Using the printing ink identical with that used in Example 1, printing was performed in the same manner as in Example 1. After the printing, EB irradiation was carried out using the Min-EB apparatus from AIT Corporation. The irradiation conditions were as follows: acceleration voltage: 40 to 150 kV; current value: 600 $\mu$A; and conveyor speed: 10 m/min. For the inerting, nitrogen was used. The oxygen concentration was varied through adjustment of the flow rate of nitrogen. Also, in this case, the oxygen concentration was measured using an oxygen content meter (zirconia type LC-750H from Toray Engineering).

After the irradiation, degree of curing was evaluated as to the drying property by touching the surface with fingers and the adhesion by applying and then peeling off a cellophane adhesive tape. The criteria for evaluation were as follows:

Drying property:
(completely cured) 5 to 1 (not cured)

Adhesion:
(excellent) 5 to 1 (poor)

The results obtained are shown in Table 2.

Figure 9:
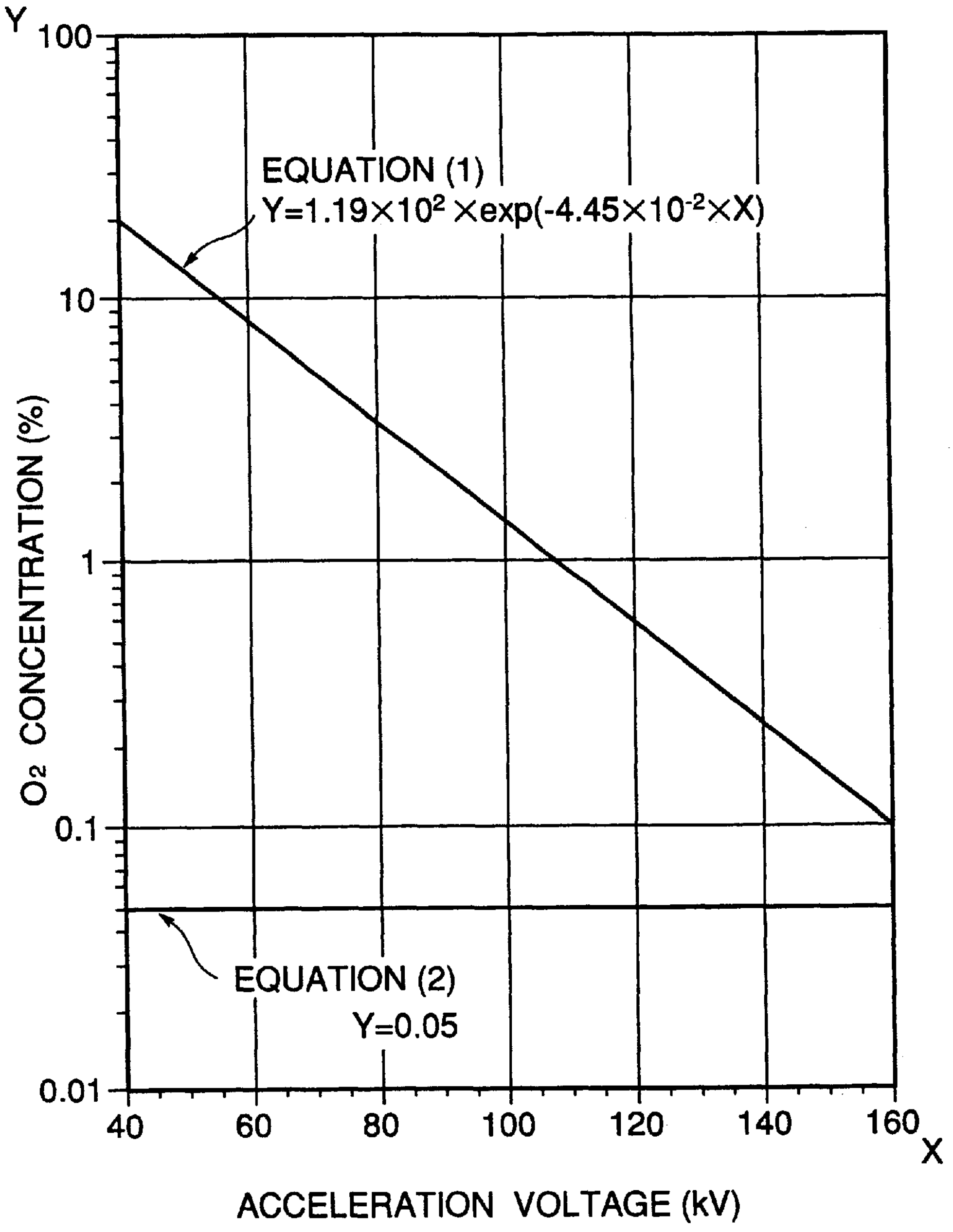
FIG. 9 is a graph showing the relationship between acceleration voltage and allowable oxygen concentration.

Based on the results, a range of oxygen concentration in which excellent degree of curing could be achieved was determined for each of the acceleration voltages. The results are shown in FIG. 9. As shown in the figure, it was confirmed that, for an acceleration voltage of 40 kV or higher, it was effective to irradiate the object (coating on the substrate or base) with an electron beam in a region of oxygen concentration Y below the straight line indicated by equation (1) in the figure, where X is the acceleration voltage (kV) and Y is the oxygen concentration (%) of a region irradiated with the electron beam, that is, in the region indicated by expression (a) below.

$$Y\leqq 1.19\times 10^2\times\exp(-4.45\times 10^{-2}\times X) \tag{a}$$

It was also found that a region defined between equations (1) and (2) in FIG. 9, that is, the region indicated by expression (b) below, was more preferable from the point of view of economy etc.

$$1.19\times 10^2\times\exp(-4.45\times 10^{-2}\times X)\geqq Y\geqq 0.05 \tag{b}$$

TABLE 2

| Acceleration voltage (kV) | | | | | | | |
|---|---|---|---|---|---|---|---|
| | 40 | Oxygen concentration (%) | 20 | 13 | 8 | 1.0 | 0.5 |
| | | Degree of curing | 5 | 5 | 5 | 5 | 5 |
| | | Adhesion | 4 | 4 | 4 | 4 | 4 |
| | 60 | Oxygen concentration (%) | 20 | 8.2 | 3.0 | 0.6 | 0.2 |
| | | Degree of curing | 3 | 5 | 5 | 5 | 5 |
| | | Adhesion | 2 | 5 | 5 | 5 | 5 |
| | 80 | Oxygen concentration (%) | 8.2 | 3.5 | 1.0 | 0.4 | 0.2 |
| | | Degree of curing | 2 | 5 | 5 | 5 | 5 |
| | | Adhesion | 2 | 5 | 5 | 5 | 5 |
| | 100 | Oxygen concentration (%) | 3.5 | 1.5 | 0.7 | 0.2 | 0.09 |
| | | Degree of curing | 3 | 5 | 5 | 5 | 5 |

TABLE 2-continued

| | | | | | | |
|---|---|---|---|---|---|---|
| | Adhesion | 3 | 5 | 5 | 5 | 5 |
| 120 | Oxygen concentration (%) | 0.2 | 0.16 | 0.17 | 0.05 | 0.03 |
| | Degree of curing | 2 | 5 | 5 | 5 | 5 |
| | Adhesion | 4 | 5 | 5 | 5 | 5 |

(Example 11)

In this example, metallic paint was used as the curable coating composition. This paint was prepared as specified below.

| | |
|---|---|
| Bisphenol A epoxy acrylate (EBECRYL EB600 from Daicel UCP Corp.) | 20 parts |
| Polyurethane acrylate (CN963B80 from Sartomer Corp.) | 15 parts |
| Ketone formaldehyde resin (Synthetic resin SK from Hules Corp.) | 10 parts |
| Isoboronyl acrylate | 30 parts |
| Hydroxyethyl acrylate | 25 parts |
| Titanium oxide (rutile type) (TIPAQUE CR-58 from Ishihara Sangyo Kaisha, Ltd.) | 100 parts |
| Additive (BYK-358 from BYK Corp.) | 0.5 part |

These were mixed and then dispersed for one hour in a sand-mill to obtain the paint. The paint was applied to a metal plate having a basecoat on a curved surface thereof (a steel plate previously applied with primer paint and then subjected to wet rubbing by means of sandpaper #300), followed by electron beam irradiation.

The apparatus shown in FIG. 6 was used as the irradiation apparatus. As the irradiation tube serving as the electron beam generating section, the Min-EB apparatus from AIT INC. was used. The conditions for irradiation were as follows: acceleration voltage: 60 kv; current value: 800 $\mu$A; irradiation width: 5 cm; and irradiation tube scanning speed: 20 m/min. Nitrogen gas was used for the inerting.

As a result of the electron beam irradiation, the coating obtained was uniform and had a sufficient hardness of 2H in terms of pencil hardness.

(Example 12)

In this example, metallic paint was used as the curable coating composition. This paint was prepared as specified below.

| | |
|---|---|
| Polyurethane acrylate (ARONIX M 6400 from Toagosei Chemical Industry Co., Ltd.) | 35 parts. |
| Bisphenol A epoxy acrylate (EBECRYL EB600 from Daicel UCP Corp.) | 10 parts |
| Isoboronyl acrylate | 25 parts |
| Hydroxyethyl acrylate | 30 parts |
| Titanium oxide (rutile type) (TIPAQUE CR-95 from Ishihara Sangyo Kaisha, Ltd.) | 100 parts |
| Additive (BYK-358 from BYK Corp.) | 0.5 part |

These were mixed and then dispersed for one hour in a sand-mill to obtain the paint. The paint was applied to a metal plate having a basecoat thereon (a steel plate previously applied with epoxy primer paint) such that the paint applied had a thickness of 30 $\mu$m, followed by electron beam irradiation.

As the irradiation apparatus, the Min-EB apparatus from AIT Corporation was used. The irradiation conditions were as follows: acceleration voltage: 50 kV; current value: 500 $\mu$A; and conveyor speed: 10 m/min. Nitrogen gas was used for the inerting.

The hardness of the coating was evaluated in terms of pencil hardness, and the adhesion of the coating was evaluated by a cross-hach adhesion test. Also, using a vibration-type rubbing fastness tester (from Daiei Kagaku Kiki), scratch resistance of the coating was evaluated by visually inspecting scratches on the coating produced by nonwoven fabric after the coating was shaken 500 times with a load of 500 g applied thereto. The criteria for evaluation were as follows:

Scratch resistance: (excellent) 5 to 1 (poor)

The evaluation results are shown in Table 3.

(Example 13)

The paint identical with that used in Example 12 was applied such that the paint applied had a thickness of 20 $\mu$m, and electron beam irradiation was performed under the same conditions as in Example 12 except that the acceleration voltage was changed to 40 kV. The coating was evaluated as to the same items as in Example 12 based on the same criteria for evaluation. The obtained results are shown in Table 3.

(Example 14)

In this example, a pressure sensitive sheet was used.

| | |
|---|---|
| N-butyl acrylate | 41 parts |
| 2-ethylhexyl acrylate | 41 parts |
| Vinyl acetate | 10 parts |
| Acrylic acid | 8 parts |

These were copolymerized in toluene, distilled off solvent o obtain acrylic copolymer.

| | |
|---|---|
| Obtained copolymer | 100 parts |
| N-butylcarbamoyl oxyethyl acrylate | 60 parts |
| Polyethylene glycol diacrylate | 3 parts |

These were mixed together to obtain an electron beam-curing pressure sensitive composition.

The electron beam-curing pressure sensitive composition thus obtained was applied to a separator such that the composition applied had a thickness of 25 $\mu$m, then electron beam irradiation was performed under the same conditions as in Example 12, and wood free paper was overlapped to obtain a pressure sensitive sheet. The obtained sheet was measured in respect of adhesion strength, tack, and retentive force. The results obtained are shown in Table 4. The adhesion strength, tack and repeelability of the pressure sensitive sheet and the quantity of unreacted monomer were measured by methods described below.

(1) Measurement of Adhesion Strength

A test piece of 25 mm wide was applied to a stainless steel plate, and after a lapse of 30 minutes of adhesion, the test piece was peeled off at a peel angle of 180 degrees at a rate of pulling of 300 mm/min to measure the adhesion strength. The result of measurement is expressed in the unit g/25 mm. A practical range was set using 1000 g/25 mm as a criterion, though it depends on uses.

(2) Measurement of Tack

Using a test piece with a width of 25 mm, tack was measured by a ball tack test and is expressed by the number of the largest possible steel ball that could be stuck at an inclination angle of 30 degrees. For steel ball numbers of 7 or above, tack was judged to fall within a practical range, though it depends on uses.

(3) Repeelability Test

The test piece mentioned above was applied to a stainless steel plate and then left to stand at 23° C. for 7 days, and repeelability and paste left on the exposed surface of the adherend (stainless steel plate) was evaluated by visual inspection. The criteria for evaluation were as follows:

Repeelability:

○: excellent; Δ: partly peelable; ×: could not peeled off.

Paste left on adherend:

○: no paste left; Δ: partly left; ×: paste left on entire surface.

(4) Measurement of the Quantity of Unreacted Monomer

After curing, a given quantity of the pressure sensitive composition was picked from the pressure sensitive sheet, admixed with 50 ml of tetrahydrofuran and then left to stand for 24 hours. Subsequently, the mixture was filtered, and the filtrate as a sample was measured by gel permeation chromatography to determine the weight (%) of the unreacted monomer n-butylcarbamoyl oxyethyl acrylate in the cured pressure sensitive composition. An unreacted monomer quantity of less than 1.0% in the cured pressure sensitive composition was judged to fall within a practical range.

These evaluation results are shown in Table 4.

(Example 15)

A pressure sensitive composition was prepared under the same conditions as in Example 14, and electron beam irradiation was performed under the same conditions as in Example 14 except that the acceleration voltage was changed to 60 kV. Evaluation was also carried out by the same methods as employed in Example 14.

(Comparative Example 5)

A coating was prepared under the same conditions as in Example 12, and using the CURETRON EBC-200-20-30 from Nisshin High Voltage Corporation as the electron beam irradiation apparatus, electron beam irradiation was performed under the following conditions: acceleration voltage: 200 kV; current value: 5 mA; and conveyor speed: 20 m/min. For the inerting, nitrogen gas was used. The obtained coating was evaluated as to the hardness, adhesion and scratch resistance, based on the same criteria as used in Example 12. The obtained results are shown in Table 3.

(Comparative Example 6)

The electron beam-curing pressure sensitive composition was applied in the same manner as in Example 14, and was irradiated with an electron beam by using CURETRON EBC-200-20-30 from Nisshin High Voltage Corporation as the electron beam irradiation apparatus under the following conditions: acceleration voltage: 200 kV; current value: 6 mA; and conveyor speed: 7.5 m/min. Nitrogen gas was used for the inerting. The adhesion strength, tack and retentive force of the obtained pressure sensitive sheet were evaluated based on the same criteria as used in Example 14. The obtained results are shown in Table 4.

(Comparative Example 7)

The electron beam-curing pressure sensitive composition was applied in the same manner as in Comparative Example 6, and using the same electron beam irradiation apparatus, electron beam irradiation was performed under the following conditions: acceleration voltage: 200 kV; current value: 6 mA; and conveyor speed: 22.5 m/min. In this case, since the conveyor speed was trebled, the irradiation dose was reduced to about ⅓. The obtained pressure sensitive sheet was evaluated as to the same items based on the same criteria as employed in Example 14. The obtained results are shown in Table 4.

TABLE 3

| | Acceleration voltage (kV) | Coating thickness (μm) | Coating hardness | Scratch resistance | Adhesion |
|---|---|---|---|---|---|
| Example 12 | 50 | 30 | 2H | 5 | 100/100 |
| Example 13 | 40 | 20 | 2H | 5 | 100/100 |
| Comp. Example 5 | 200 | 30 | 2H | 5 | 30/100 |

TABLE 4

| | Acceleration voltage (kV) | Adhesion strength (g/25 mm) | Tack | Repeelability | | Unreacted monomer (%) |
|---|---|---|---|---|---|---|
| | | | | Peelability | Paste left | |
| Ex. 14 | 50 | 1260 | 10 | O | O | <0.5 |
| Ex. 15 | 60 | 1150 | 9 | O | O–Δ | <0.5 |
| Comp. Ex. 6 | 200 | 880 | 6 | O | O | <0.5 |
| Comp. Ex. 7* | 200 | 950 | 13 | X | Δ | 2.9 |

*The conveyor speed was trebled.

As seen from Table 3, Examples 12 and 13 were excellent in adhesion of their coating while Comparative Example 5 showed poor adhesion. Namely, Examples .12 and 13 had a crosslink density distribution in the thickness direction and had a lower crosslink density at a portion of the coating adjoining the metal plate, and thus no shrinkage occurred at this portion, with the result that the adhesion of the coating improved. In Comparative Example 5, on the other hand, since the coating was crosslinked up to a portion thereof adjoining the metal plate (crosslink density was high throughout the entire thickness), shrinkage occurred at the portion adjoining the metal plate, with the result that the adhesion lowered.

Also, as seen from Table4, in Examples 14 and 15, the adhesion strength with respect to the stainless steel plate as the adherend, the tack measured using steel balls, and the repeelability were all excellent, and the quantity of the unreacted monomer was small. This proves that the pressure sensitives of Examples 14 and 15 had a crosslink density distribution. By contrast, Comparative Example 6 showed low adhesion strength with respect to the stainless steel plate as the adherend and had low tack as measured with the use of steel balls. This proves that the pressure sensitive of Comparative Example 6 had no crosslink density distribution and had a high crosslink density throughout the entire thickness thereof. In Comparative Example 7, the conveyor speed was trebled to reduce the irradiation dose to approximately ⅓, and as a result, the crosslink density lowered while the adhesion strength and tack improved. However, as seen from a large quantity of the unreacted monomer, the crosslink density was low throughout the entire thickness, and as a consequence the repeelability was poor.

As described above, according to the present invention, an object is irradiated with an electron beam at low acceleration voltage so as to be crosslinked, cured or modified, and therefore, remarkable advantages are obtained, for example, adverse influence on the working environment is small, the need for inerting using an inert gas is lessened, and deterioration of the substrate or base is reduced.

According to the present invention, an electron beam irradiation process capable of electron beam irradiation with high energy efficiency and an electron beam-irradiated object can be provided without entailing problems with apparatus etc.

Also, in the present invention, the electron beam is irradiated while the electron beam irradiation apparatus is moved for scanning, and therefore, even an object having a curved or uneven surface can be satisfactorily irradiated with the electron beam, without causing problems with apparatus or deterioration in quality such as uneven curing.

Further, according to the present invention, instead of uniformly crosslinking or modifying an entire object, a distribution of crosslink density or hardness is created in the thickness direction of the object or the object is partially crosslinked or cured with respect to its thickness direction, whereby objects can be given a variety of crosslinking or curing patterns. Also, the use of the vacuum tube-type electron beam irradiation apparatus eliminates the problems associated with conventional apparatus.

What is claimed is:

1. An electron beam irradiation process for irradiating an object with an electron beam, wherein when an acceleration voltage of an electron beam to be irradiated is higher than 40 kV and equal to or lower than 120 kV, the electron beam is irradiated in such a manner that an oxygen concentration of a region irradiated with the electron beam fulfills a relationship indicated by expression (a)

$$Y \leqq 1.19\times10^{2}\times\exp(-4.45\times10^{-2}\times X) \quad \text{(a)}$$

where X is the acceleration voltage (kV) and Y is the oxygen concentration (%) of the region irradiated with the electron beam.

2. An electron beam irradiated object obtained by irradiating the object with an electron beam in accordance with the process according to claim 1.

3. An electron beam irradiation process for irradiating an object with an electron beam, wherein when an acceleration voltage of an electron beam to be irradiated is higher than 40 kV and equal to or lower than 120 kV, the electron beam is irradiated in such a manner that an oxygen concentration of a region irradiated with the electron beam fulfills a relationship indicated by expression (b)

$$1.19\times10^{2}\times\exp(-4.45\times10^{2}\times X) \geqq Y \geqq 0.05 \quad \text{(b)}$$

where X is the acceleration voltage (kV) and Y is the oxygen concentration (%) of the region irradiated with the electron beam.

* * * * *